(12) United States Patent
Pirš et al.

(10) Patent No.: US 7,061,462 B1
(45) Date of Patent: Jun. 13, 2006

(54) DRIVING SCHEME AND ELECTRONIC CIRCUITRY FOR THE LCD ELECTROOPTICAL SWITCHING ELEMENT

(76) Inventors: Janez Pirš, Jadranski 6, 1000 Ljubljana (SI); Bojan Marin, Topniska 43, 1000 Ljubljana (SI); Sivija Pirš, Brilejeva 22, 1000 Ljubljana (SI); Dušan Ponikvar, Vodnikcva 308a, 1117 Ljubljana (SI)

( * ) Notice: Subject to any disclaimer, the term of this patent is extended or adjusted under 35 U.S.C. 154(b) by 0 days.

(21) Appl. No.: 09/830,290

(22) PCT Filed: Oct. 25, 1999

(86) PCT No.: PCT/SI99/00024

§ 371 (c)(1),
(2), (4) Date: Apr. 25, 2001

(87) PCT Pub. No.: WO00/25175

PCT Pub. Date: May 4, 2000

(30) Foreign Application Priority Data

Oct. 26, 1998 (SI) .................................. P-9800277
Oct. 6, 1999 (SI) .................................. P-9900232

(51) Int. Cl.
*G09G 3/36* (2006.01)
(52) U.S. Cl. ........................... 345/96; 345/94; 345/204
(58) Field of Classification Search ............ 345/87–89, 345/55, 204, 96, 208–209, 207, 38, 48, 50, 345/33–34, 53–54, 90, 94; 349/13–14, 19, 349/33

See application file for complete search history.

(56) References Cited

U.S. PATENT DOCUMENTS

| 3,031,986 A | 5/1962 | Bradley et al. |
| 3,575,491 A | 4/1971 | Heilmeier |

(Continued)

FOREIGN PATENT DOCUMENTS

CH         671485 A5    8/1989

(Continued)

OTHER PUBLICATIONS

"Method to Measure and Reduce Unblanced DC Voltage in Active Matrix LCDS", IBM Technical Disclosure Bulletin, , Aug. 1, 1992, pp. 162-164, US, vol. 35, No. 3, IBM CORP. New York.

*Primary Examiner*—Xiao Wu
*Assistant Examiner*—Jean Lesperance
(74) *Attorney, Agent, or Firm*—Venable LLP; Robert Kinberg; Catherine M. Voorhees

(57) ABSTRACT

The invention relates to the problem of the driving of the LCD electrooptic-switching element (1) with alternating, square-wave electric signals, the amplitude of witch can vary between different voltage levels in correspondence with the actual functioning state of the LCD electrooptic-switching element. The polarity changes of the electric driving signals is controlled by the integrator (9), integrating the difference of the electric potentials on the driving electrodes (2, 3) of the LCD electrooptic-switching element, in such a way that the value of time integral of the driving electric field is always kept within a selected interval. Besides this the time dependence of the electric driving signals can be optionally modified so that with every change of the polarity of the electric driving signals, the potentials on both driving electrodes get the same value for a time, which is significantly shorter than the switching time of the LCD electrooptic switching element.

12 Claims, 7 Drawing Sheets

U.S. PATENT DOCUMENTS

| | | | |
|---|---|---|---|
| 3,890,628 A | 6/1975 | Gurtler | |
| 3,961,840 A | 6/1976 | Shiguri | |
| 3,967,881 A | 7/1976 | Moriyama et al. | |
| 4,121,203 A * | 10/1978 | Edwards et al. | 345/54 |
| 4,205,311 A | 5/1980 | Kutaragi | |
| 4,279,474 A | 7/1981 | Belgorod | |
| 5,047,789 A * | 9/1991 | Kanayama et al. | 347/232 |
| 5,074,647 A | 12/1991 | Fergason et al. | |
| 5,181,133 A * | 1/1993 | Lipton | 349/15 |
| 5,189,376 A * | 2/1993 | Roberge et al. | 324/662 |
| 5,216,426 A * | 6/1993 | Ishioka | 341/168 |
| 5,239,293 A * | 8/1993 | Barbier | 345/98 |
| 5,252,817 A | 10/1993 | Fergason et al. | |
| 5,315,099 A | 5/1994 | Gunz et al. | |
| 5,347,383 A | 9/1994 | Fergason | |
| 5,377,032 A | 12/1994 | Fergason et al. | |
| 5,414,441 A * | 5/1995 | Memarzadeh et al. | 345/87 |
| 5,442,370 A * | 8/1995 | Yamazaki et al. | 345/94 |
| 5,489,910 A * | 2/1996 | Kuwata et al. | 345/212 |
| 5,548,423 A * | 8/1996 | Natsunaga | 349/106 |
| 5,689,206 A * | 11/1997 | Schaller | 327/337 |
| 5,953,002 A * | 9/1999 | Hirai et al. | 345/204 |
| 6,188,395 B1 * | 2/2001 | Yatabe | 345/211 |
| 6,331,844 B1 * | 12/2001 | Okumura et al. | 345/87 |
| 6,333,728 B1 * | 12/2001 | Libsch et al. | 345/90 |
| 6,507,330 B1 * | 1/2003 | Handschy et al. | 345/94 |

FOREIGN PATENT DOCUMENTS

| | | |
|---|---|---|
| DE | 30 17 241 A1 | 11/1981 |
| EP | 0005417 A1 | 11/1979 |
| EP | 0091514 B1 | 10/1983 |
| EP | 0157744 A1 | 10/1985 |
| EP | 0331861 A1 | 9/1989 |
| EP | 0 550 384 | 7/1993 |
| FR | 2293188 A1 | 7/1976 |
| GB | 2138590 A | 10/1984 |
| JP | 08 082785 | 3/1996 |
| WO | WO 87 01468 | 3/1987 |
| WO | WO 92 16820 | 10/1992 |

* cited by examiner

DRIVING SCHEME AND ELECTRONIC CIRCUITRY FOR THE LCD ELECTROOPTICAL SWITCHING ELEMENT

BACKGROUND OF THE INVENTION (1) Field of the Invention

The present invention relates to the driving method for the LCD electrooptic-switching element and the manufacturing of the automatic electronic driving circuitry for the LCD electrooptic-switching element, which is among other applications especially interesting as the basic active element in the various optical systems and automated protection devices, such as automatic welding helmets.

The present invention relates to the driving method and the manufacturing of the automatic electronic driving circuitry for the LCD electrooptic switching element, which allows for the:

- long-term autonomous functioning independent of the external power sources
- optimizing of the electric driving signals in the sense of the fast electrooptical switching dynamics, long life time of the LCD electrooptic switching elements and the minimal use of energy (several years without changing the batteries):
  - multilevel electronic driving of the LCD electrooptic switching elements
  - minimal consumption of the electric energy for the driving of the LCD electrooptic switching elements
  - compensation of the DC component of the electric driving signals for the LCD electrooptic switching elements (2) Description of Related Art So far several technical solutions and applications of the electrooptical switching elements were made. The solutions are disclosed in the following patents: the use of the double "twist-nematic" LCD cell (Gurtler, U.S. Pat. No. 3,890,628); one TN and one "Guest-host" LCD cell Moriyama, U.S. Pat. No. 3,967,881); the use of the LCD or the ceramic active element (Budminger, FR 2,293,188); the LCD with passive and active cell (Hornell, EP 0,005,417); the optical switch and the variable polarizer (Fergason, U.S. Pat. No. 5,074,647). There are also a number of partial solutions of said technical problem. All of the modern technical solution incorporate an autonomous battery power supply supported by the semiconductor solar cell which significantly increases the life time of the battery power supply (Pfanzelt, DE 3,017,241: Bruhin, EP 0,091,514: Tyers, GB 2,138,590: Bruhin CH 671,485: Stanelli, EP 0,331,861):

- minimization of the electric energy consumption and the optimization of the electric driving signal is guaranteed either by the use of the automatic turn-off of the protective automatic LCD welding filter and manual turn-on just prior to the welding (Fergason, U.S. Pat. No. 5,377,032), or with the low-frequency driving of the LCD electrooptic switching elements which significantly reduces the consumption of the electric energy in such a way that the automatic turn-off is no longer needed (Gunz, Ghisleni, EP 550,384, U.S. Pat. No. 5,315,099). While the former patent application does not represent any significant novelty and is not solving the problem of the electric power consumption satisfactorily, the later solution is technically very important.

Solving the problem of the low power consumption by using slowly varying electric driving signals seems to be the best general technical solution at present. However the use of such driving schemes results in several new problems that have not been adequately solved so far:

- Synchronization of the driving signals with the time intervals, when the LCD electrooptic switching element has to be in the optically closed state (for example: welding),
- Efficient compensation of the long-term DC component of the electric driving signals,
- Electric driving field screening due to the ionic conductivity effects in liquid crystals (variations of light attenuation in the optically closed state of the LCD electrooptic switching element,
- Electric driving field screening due to the electric potential build-up at the orienting polymer/liquid crystal interface—"residual DC".

In their patents (EP 550,384, U.S. Pat. No. 5,315,099) Gunz and Gisleni manage to solve the above-specified problems only partially: Since it is not possible to synchronize the driving signals at such low frequencies with the time periods when the LCD electrooptical element has to be in the closed state (for example: welding), the above described LCD light shutter and the electric driving technique cannot provide a complete compensation of the DC component of the electric driving voltage, resulting in the reduced life time of the LCD electrooptic switching elements. The authors of the patent application EP 550,384 diminish this problem by changing the phase of the electric driving signals with every activation of the LCD electrooptical element, which only reduces the consequences and does not represent a reliable solution of the problem. As they cannot avoid the adverse effects of the long-term DC component of the electric driving signals, Gunz and Gisleni suggest the use of additional protective layers in the LCD light shutter (U.S. Pat. No. 5,315,099). The gradual build-up of the DC component of the electric driving signals results in pronounced light attenuation variations in the closed state of the LCD electrooptic switching element (for example: welding) due to the screening of the electric field caused by the above mentioned "residual DC" effect. As the result of this the technical solution, as proposed by Gunz and Gisleni, cannot be used with the frequencies above 0.3 Hz (typically), since the electric field screening phenomena become too apparent and distract the user.

The problems, related to the build-up of the long-term DC component of the electric driving signals, also cannot be adequately solved by the standard long-term DC component compensation techniques, disclosed in the patents (U.S. Pat. No. 4,205,311, JP 08082785) and published in the IBM technical disclosure bulletin 35, 3, Aug. 1992 as well as in SID Digest 20, 226, 1989. All these techniques are based on the formation of a mean DC voltage, connected to one of the two electrodes of the LCD electrooptic-switching element. This "mean DC voltage" is selected in such a way that the long-term DC component of the electric driving signals is eliminated. It is generated by the integration of the electric driving signal over a longer time interval (i.e. large number of the electric driving signal periods). Therefore such a solution is not very applicable in the case of fast, strong transient "DC effects", which are characteristic for many applications (for example: welding), when using electric driving signals with slowly varying polarity. Due to a slow response of the "mean DC voltage" generating system, it takes quite some time before the DC component, built-up during the transient effect, averages out. Therefore the "residual DC" effects, as described above, can become very pronounced and can distract the user. Furthermore the above-described technique reduces the effective amplitude of the electric driving signal for the LCD electrooptic switching element by a factor of 2. This can be an important obstacle in cases, when high switching speeds are required (for example: welding). Another known solution proposed by Fergason, U.S. Pat. No. 5,347,383, U.S. Pat. No. 5,252,817 uses the dual-frequency driving, the frequency being dependent on the optical state that the electrooptical switching element currently occupies. This allows for the quick changing of the polarity of the electric driving signals when the filter is in the optically open state (reduced flickering of the filter) and slow changing when the filter is optically closed and the flickering is not so pronounced. The consumption of the electric energy is therefore reduced, however only in one optical state, which does not represent the optimal solution of the problem of the consumption of the electric energy.

The increased switching speed of the LCD electrooptic switching elements is generally achieved by using the high amplitude of the electric driving signals (Heimeier, U.S. Pat. No. 3,575,491, U.S. Pat. No. 3,731,986). The optimal results can be achieved by using the appropriate time dependence of the amplitude of the electric driving signals for the LCD electrooptic switching elements (FIG. 1) as disclosed in the patent application (Toth, EP 0,157,744). According to this technical solution the LCD electrooptic switching element is already in the "open state", driven with the electric signals, the amplitude of which is smaller than the voltage threshold required for the electrooptical switching. The switching speed to the closed state of the LCD electrooptical-switching element is therefore significantly increased. The amplitude of the electric driving signals is very high immediately after the activation and decreases to the voltage level, which is required to maintain the required optical light attenuation.

SUMMARY OF THE INVENTION

The scope and the goal of the invention is the electronic driving scheme as well as the adequate electronic circuitry for the driving of the LCD electrooptic switching element that will offer the best compromise between low electric power consumption (—slowly varying electric driving signals), fast switching dynamics, stable light attenuation and long life time of the products resulting from the efficient reduction of the long term DC component of the electric driving signals for the LCD electrooptic switching element. The proposed technical solution, based on the integration of the driving voltage between the electrodes of the LCD electrooptic switching element, is specifically characterized in that it:

Not only allows for the complete annihilation of the long-term DC component of the electric driving signals for the LCD electrooptic switching element, but also allows for the "short term" DC electric driving voltage compensation within every period of the electric driving signal polarity change (two polarity reversals), Allows for the use of the multilevel electric addressing (see FIG. 1) of the LCD electrooptic switching element, using high switching pulse amplitudes to increase the dynamic response of the LCD electrooptic switching element, as the proposed driving scheme allows for the fast "DC balancing" of the electric driving signals within two polarity reversals (-DC balancing cycle), irrespectively of the time variations of the driving voltage amplitude.

According to the invention, the problem is solved by employing a driving scheme for an LCD electrooptic element with alternating square-wave electric signals where the amplitude of the electric signals may vary between different electric levels according to the actual status of the LCD electrooptic element so that optimum dynamics of the electrooptic response is assured. According to the invention an integrator controls the changing of the polarity of the electric driving signals by integrating the potential differences between electrodes of an LCD electrooptic switching element so that the value of the time integral of the driving voltage is kept within a predetermined interval to determine the time interval for the polarity change while allowing for complete annihilation of the long-term DC component of the electric driving signal for the LCD electrooptic switching element. In addition, the integrator according to the invention may complement the above driving scheme by allowing for the short, spontaneous discharging of the capacitance of the LCD electrooptic switching element at every reversal of the polarity of the driving signals.

BRIEF DESCRIPTION OF THE SEVERAL VIEWS OF THE DRAWINGS

Following is a detailed description of the preferred embodiments of the invention further described by means of the annexed drawings.

DETAILED DESCRIPTION OF THE INVENTION

Figure 1:
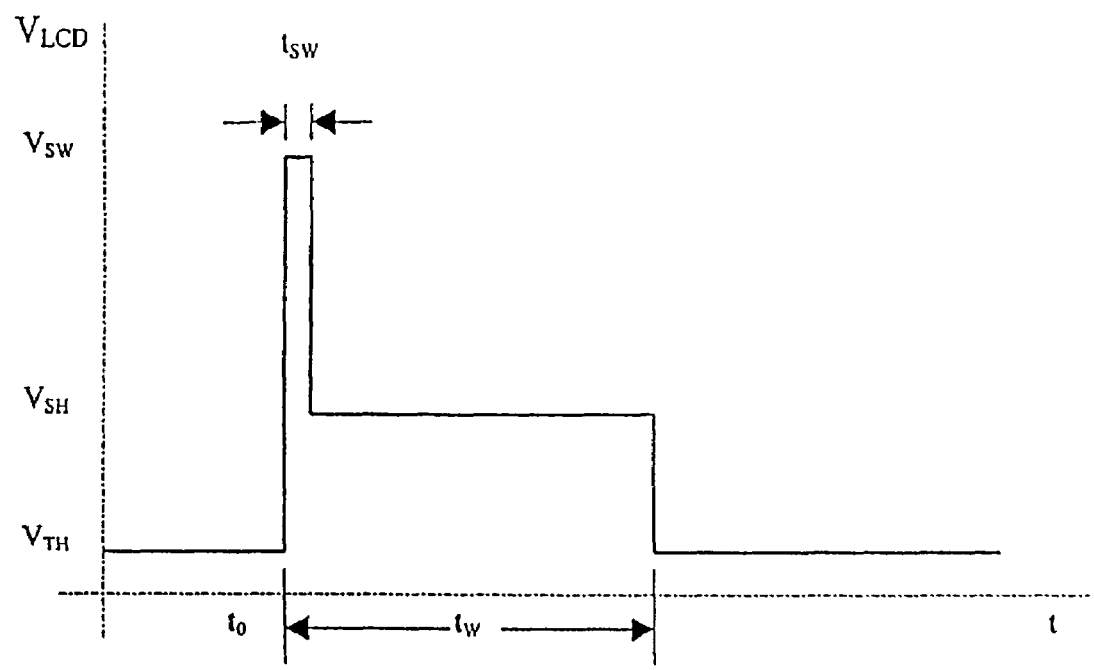
FIG. 1.—Multilevel time dependence of the amplitude of the electric driving signals allowing for the maximum switching speed FIG. 2a—Symmetric, square-wave, periodic, alternating electric driving signals for the LCD electrooptic-switching element FIG. 2b—Irregular electric driving signals for the LCD electrooptic switching element, having the long-term DC component equal to zero FIG. 3.—Block diagram of the electronic circuitry, allowing for the compensation of the long-term DC component of the electric driving signals based on the complete time integral of the difference of the driving electric potentials across the LCD electrooptic switching element FIG. 4.—Time-dependence of the most essential electric signals of the electronic circuitry in the FIG. 3.

The present invention provides the electric driving scheme for the LCD electrooptic switching elements using alternate square-wave electric signals (FIG. 2b), which are controlled by the integrator, which integrates the potential difference of the voltages on the driving electrodes of the LCD electrooptic switching elements in such a way that it preserves the value of the time integral of the electric driving voltage for the LCD electrooptic switching element within the predetermined interval (e.g., $V_{C1} \leq I_{nt} \leq V_{C2}$).

This invention is further characterized in that it can be optionally upgraded by using the electric driving scheme for the LCD electrooptic switching elements, which with every change of the polarity of the electric driving signals, connects both electrodes of the LCD electrooptic switching element to the same electric potential for a time, which is significantly shorter than the electrooptical response of the LCD electrooptic switching element, but longer than the time needed for the spontaneous discharge of the capacitor represented by the electric capacitance of the LCD electrooptic switching element. Approximately 50% reduction in the electric power consumption is achieved this way.

Another aspect of the invention is that it, unlike other existing technical solutions, allows without any limitations the use of the optimal time dependence of the amplitude of the electric driving signals (maximal speed of the electrooptical response), as well as very slow changes of the polarity of the electric driving signals with specific time dependence (minimal consumption of the electric energy) while assuring the complete compensation of the DC component of the electric driving signals for the LCD electrooptic switching element (life time, . . . ):

It allows for the use of the conventional driving technique, based on the time dependence of the amplitude of the electric driving signals (FIG. 1.) resulting in maximal speed of the electrooptical response of the LCD electrooptic switching element. The basic idea is that the electric driving circuitry provides "a weak electric driving voltage" ($V_{LCD} = V_{TH}$) between the driving electrodes of the LCD electrooptic switching element (on the "switching threshold" $V_{TH}$ for the LCD electrooptic switching element) even during the time before $t_o$, when the command for the optical switching occurs (for example: welding) and the LCD light shutter is still in the open state (transmitting light). In this situation the response of the LCD light shutter to the driving signals is significantly faster. If at the same time, at the beginning of the switching into the closed state ($t=t_o$), the amplitude of the driving electric field raises significantly above the switching threshold $V_{TH}$ for the driving of the LCD electrooptic switching element ($V_{LCD} = V_{SW} \gg V_{TH}$), a very fast switching dynamics can be obtained. During the closed state (time-interval $t_w$), after an adequate time ($t=t_{sw}$) has elapsed, which is determined by the switching speed of the LCD electrooptic switching element, the amplitude of the electrical driving signal can be reduced to the value ($V_{LCD} = V_{SH}$), that maintains the required light attenuation (for example: "shade" during the welding).

Figure 2A:
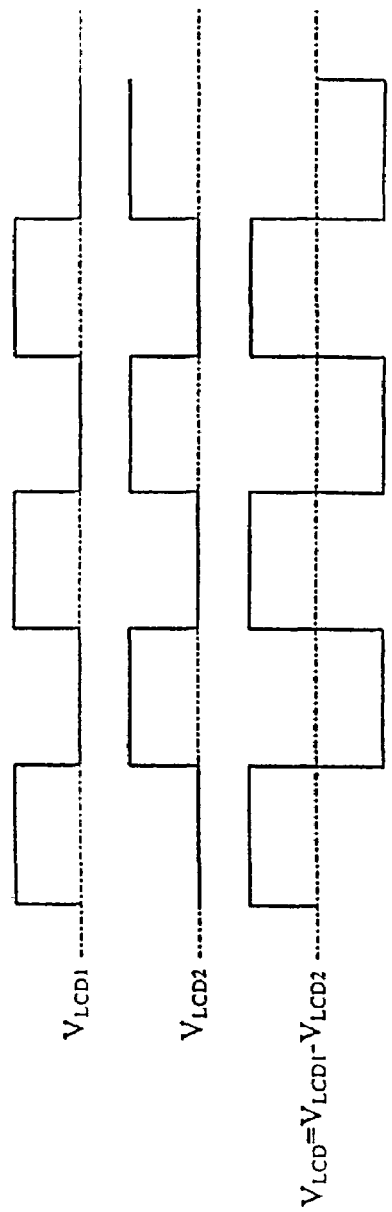
Figure 2B:
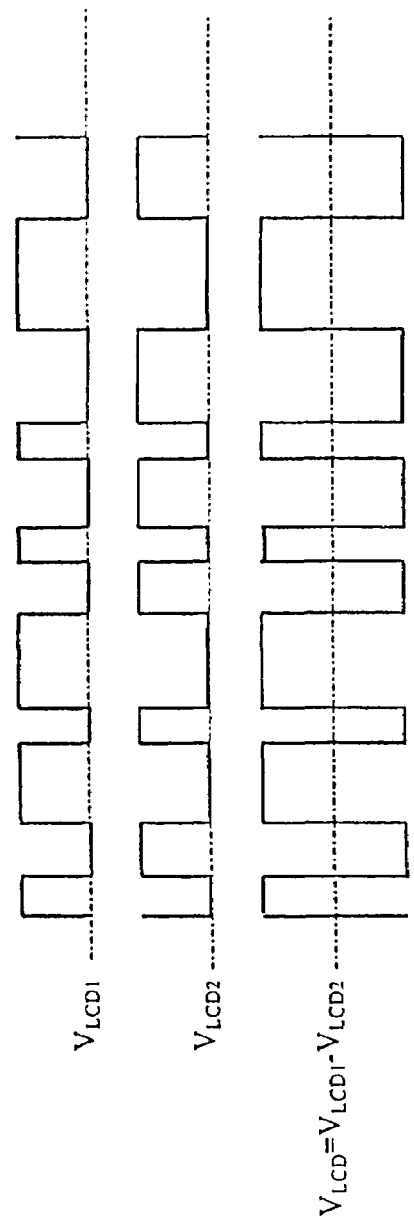

It provides the complete compensation of the long-term DC component of the electric driving field for the LCD electrooptic-switching element. The driving of the LCD electrooptic-switching element with the DC voltage is basically unacceptable because of the electro-chemical phenomena, which tend to reduce its lifetime. At the same time, due to the presence of ions in the liquid crystal and in the orienting layer, the electric charge screening of the electrical driving field occurs, resulting in an inadequate performance. Contrary to the other technical solution, which as a rule use symmetrical, square-wave, periodical, alternating electric driving signals (FIG. 2a), the DC component of the electric driving field of which equals zero, the present invention is based on the use of a square-wave, from the frequency point of view irregular driving signals having the long-term DC component (several 10 seconds) equal to zero (FIG. 2b). Since the proposed solution is based on the time integration of the electric potential difference of the driving signals and the appropriate time dependence of the changing of the polarity of the said driving signals, it provides the complete compensation of the long-term DC component even when using the electric driving signals with very slow changing of the polarity so that they cannot possibly be synchronized with the signals controlling the optical switching of the LCD electrooptic switching element.

It allows for the minimal consumption of the electric power needed for the driving of the LCD electrooptic switching element based on the above mentioned very slow changing of the polarity of the electric driving signals, as well as their special time dependence. The fact is that the driving of the LCD electrooptic switching element is in practice for the sake of simplicity realized with two alternate, essentially identical electric driving signals, phase shifted by 180°, for each of the driving electrodes. So the electric field, generated between the said electrodes, has a constant amplitude and the periodically varying polarity (FIG. 2a). The inadequacy of such a driving method is above all the fact that the electronic driving circuitry, with every change of the polarity of the electric driving field in the LCD electrooptic switching element, first has to remove the entire electric charge from the capacitor, represented by the electric capacitance of the LCD electrooptic switching element and then charge it in the opposite sense. Although it is actually dealing with the "capacitive current", it actually results in the direct consumption of the electric energy. This invention is characterized in that it solves this problem in such way that with every change of the polarity of the electric driving signals both electrodes of the LCD electrooptic switching element are connected to the same electric potential for the time, which is significantly shorter than the electrooptical response of the LCD electrooptic switching element, but noticeably longer than the time needed to remove the electric charge. This allows for the spontaneous discharge of the capacitor represented by the electric capacitance of the LCD electrooptic switching element, which leads to the reduction of the consumption of the electric power by approximately 50%. According to the invention the above described LCD driving concept is accomplished by the means, providing the additional small relative time/phase shift between both electric driving signals for the LCD electrooptic switching element (slightly away from the ideal 180° phase shift). The time dependence of the electric driving signals for the LCD electrooptic switching element with the said additional phase shift has not been described so far, which is evident from all the manufacturers manuals for the use of the integrated circuits, designed for the driving of the LCD displays, as well as the professional publications on the driving schemes.

The circuit described is unique by the implementation of the integrator input circuit, which contrary to the classical integrators, where the integrating capacitor is charged by a continues current, proportional to the input voltage, here the charge proportional to the input voltage is periodically, with a sufficiently short period, transferred into the integrating capacitor. Using this technique the average input current to the integrator is reduced without the use of a large value input resistors, which are difficult to be realized using microelectronic design. Since the average input current to the integrator is small, the current consumption of the power supply for the LCD electrooptic-switching element is also small.

The circuit described is characterized also by its implementation of the integrator circuit, which assures the complete transfer of the charge from the charge transfer capacitor into the integrating capacitor and, at the same time, has minimal power consumption.

The circuit described is additionally characterized by its implementation of the comparator circuit, which is also used to discharge the integrating capacitor, when the voltage across its terminals reaches the predefined value $V_C$ and has minimal power consumption.

The electronic realization of the above described scheme for the electric driving signals using the additional phase shift, which results in the significant reduction of the electric power consumption, is by itself very simple and does not need any further description. The long-term compensation of the DC voltage component of the driving signals for the LCD electrooptic switching element based on the time integration of the driving signals, is however far more complex and is therefore described in three examples of the preferred embodiment:

PREFERRED EMBODIMENT 1

Figure 3:
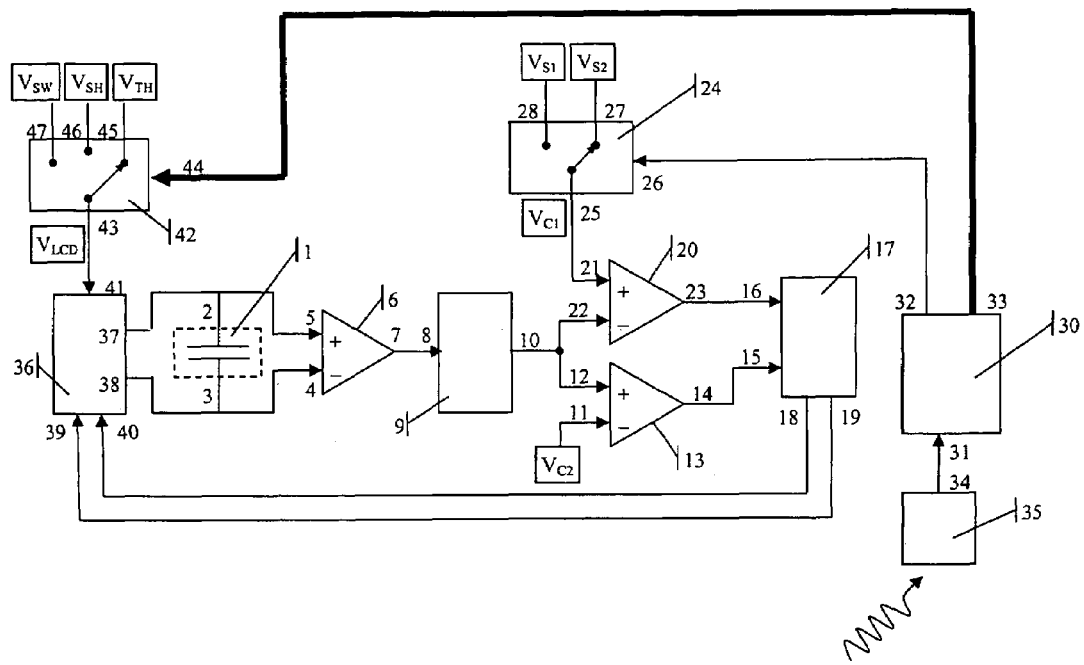
Figure 4:
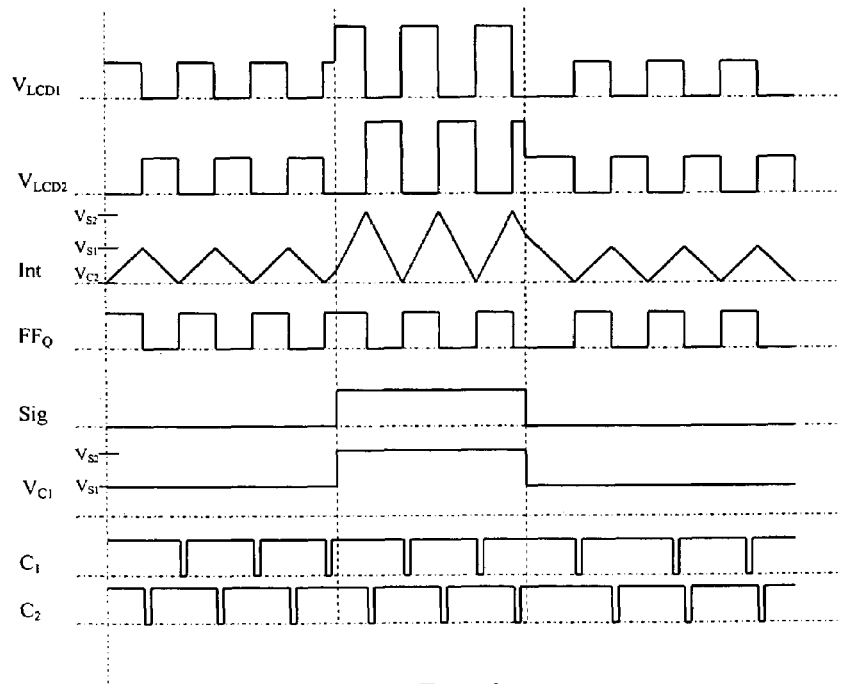

The block diagram of the electronic driving circuitry for the driving of the LCD electrooptic switching element 1, providing the long-term compensation of the DC component of the electric driving field, is illustrated in the FIG. 3., while the most relevant electric signals in the said circuitry are shown in the FIG. 4.:

The basic principle of the operation of the said electric circuitry is based on the measuring of the time integral of the difference of the electric driving signals on the electrodes of the LCD electrooptic switching element 1 and the corresponding time changes of the polarity in such way that the integral of the difference of the said driving signals remains all the time within the allowed interval ($V_{C1}$ to $V_{C2}$). This results in the complete compensation of the long-term DC voltage component of the electric driving signals for the LCD electrooptic-switching element 1. Therefore the driving signals ($V_{LCD1}$ and $V_{LCD2}$ in FIG. 4.) on the electrodes 2 and 3 of the LCD electrooptic switching element 1 are connected to the difference inputs 4 and 5 of the differential amplifier 6, while the output signal 7, which is proportional to the electric driving field for the LCD electrooptic element 1, is connected to the input 8 of the integrator 9. The output signal 10 (Int in FIG. 4.) of the integrator 9 is connected to the comparator inputs 12 and 22 of the comparators 13 and 20. Since the reference input 11 of the comparator 13 is connected to the electrical potential ($V=V_{C2}$) and the reference input 21 is connected to the reference voltage level ($V=V_{C1}$), the signals, generated by the comparators 13 and 20 at their outputs 14 and 23 ($C_1$ and $C_2$ in FIG. 4.), enable the control over the electric driving signals ($V_{LCD1}$ and $V_{LCD2}$ in FIG. 4.) for the LCD electrooptic switching element 1 in such way that the time integral of the difference of the said DC voltage component of the electric driving field never exceeds the allowed value. The time dependence of the electric driving signals for the LCD electrooptic switching element 1 is defined by the comparators 13 and 20, their outputs 14 and 23 being connected via the "set/reset" inputs 16 and 15 of the logic "flip/flop" circuitry 17. Under the control of the said driving signals, the "flip/flop" circuitry 17 generates the driving signals ($FF_Q$ in FIG. 4. and $FF_{\overline{Q}}$) at its outputs 18 and 19 for each of the electrodes of the LCD electrooptic switching element 1 respectively, so that they are phase shifted by 180° ($Q/\overline{Q}$). The logic control signals at the outputs 18 and 19 of the "flip/flop" circuitry 17 are connected to the inputs 39 and 40 of the voltage translator 36 which transforms them into the driving signals for the LCD electrooptic switching element 1 with the adequately selected amplitude of the said driving signals at its outputs 37 and 38 connected to the control electrodes 2 and 3 of the LCD electrooptic switching element 1.

The time dependence of the amplitude of the electric driving signals for the LCD electrooptic switching element 1, providing for the maximum speed of the activation of the said switching element 1, can be optionally implemented in the above described electric driving scheme by using the analogue switch 42, controlled by the logic circuitry 30, which is in turn controlled by the sensor 35 so that it corresponds to the time dependence presented in FIG. 1. This is achieved in such way that the control electrical impulse (Sig in FIG. 4), which is generated by the sensor 35 at its output 34, connected to the input 31, activates the logic circuitry 30. The said logic circuitry via the outputs 33 of the control bus, connected to the control inputs 44 of the analogue switch 42, selects between the voltages ($V_{SW}$, $V_{SH}$, $V_{TH}$), which are connected to the inputs 45, 46, 47 of the analogue switch 42. The selected voltage $V_{LCD}$ at the output 43 is connected to the driving input 41 of the voltage translator 36.

The voltage translator changes the amplitude of the logic signals which are connected to the inputs 39 and 40 and transforms them into the driving signals for the LCD electrooptic switching element 1 with the amplitude equal to the voltage on its control input 41 So the amplitude of the electric driving signals on the control electrodes 2 and 3 of the LCD electrooptic switching element 1 can be varied within the required time sequence (FIG. 1.) in accordance with the signal of the sensor 35 (Sig in FIG. 4.) marking the period of the activation of the LCD electrooptic switching element 1, allowing for the maximum switching speed of the LCD electrooptic switching element 1.

The above described driving scheme for the driving of the LCD electrooptic switching element 1, due to large differences in the amplitudes of the driving signals on the electrodes 2 and 3 of the LCD electrooptic switching element 1, can cause significant differences in duration times for different electric voltage levels with the said electric driving signals. Therefore it is useful to optionally change the reference voltage level $V_{C1}$ on the input 21 of the comparator 20 according to the signal generated by the sensor 35 at its output 34, which marks the activation period of the switching element in such a way that the time-intervals of the polarity change of the electric driving signals are as uniform as possible. The appropriate selection of the reference voltage $V_{C1}$, on the input 21 of the comparator 20 is provided by the logic control circuitry 30, which in accordance with the signal generated by the sensor 35 on its output 34 connected to the input 31 of the said control circuitry 30. The output 34 of the circuitry 30 connected to the control input 26 of the analogue switch 24, controls the said analogue switch synchronously with the signals, marking the time period of the activation of the LCD switching element (for example: welding) so that it selects between the voltage levels $V_{S1}$, and $V_{S2}$, connected to its inputs 27 and 28. The selected voltage $V_{C1}$ appearing at its output 25, connected to the reference input 21 of the comparator 20 ($V_{cl}$ in FIG. 4.), determines the duration times for different electric driving voltage levels and the time intervals of the electric driving signals polarity change.

PREFERRED EMBODIMENT 2

The above described realization of the regulation of the electric driving signals, based on the time integration of the driving voltage between the electrodes of the LCD electrooptic switching element 1, is certainly not the only possible approach. Due to the stability of the electronic components, it is possible to simplify the driving scheme so that the regulation is reduced to the comparison of the time integrals of the two consecutive intervals, during which the polarity of the signals is reversed. So the integration after every polarity reversal of the driving signals can be interrupted in such a way that the integration capacitor is discharged and the integration process restarted. Using this approach, only one comparator is needed instead of two and the differential amplifier is not necessary any more. However two additional analogue switches have to be included, one of them being used for the selection of the electric driving signal from one of the electrodes of the LCD electrooptic switching element 1 and the other one for the discharging the integration capacitor. The general performance of this simplified solution is very similar to the above-described preferred embodiment #1, however the realization of the electric circuitry by itself is somewhat simpler. In order to make the comparison easier, all of the electronic elements and subassemblies in the following discussion, which perform the same function, are marked with the same numbers as in the preferred embodiment #1 (up to and including No. 47)

Figure 5:
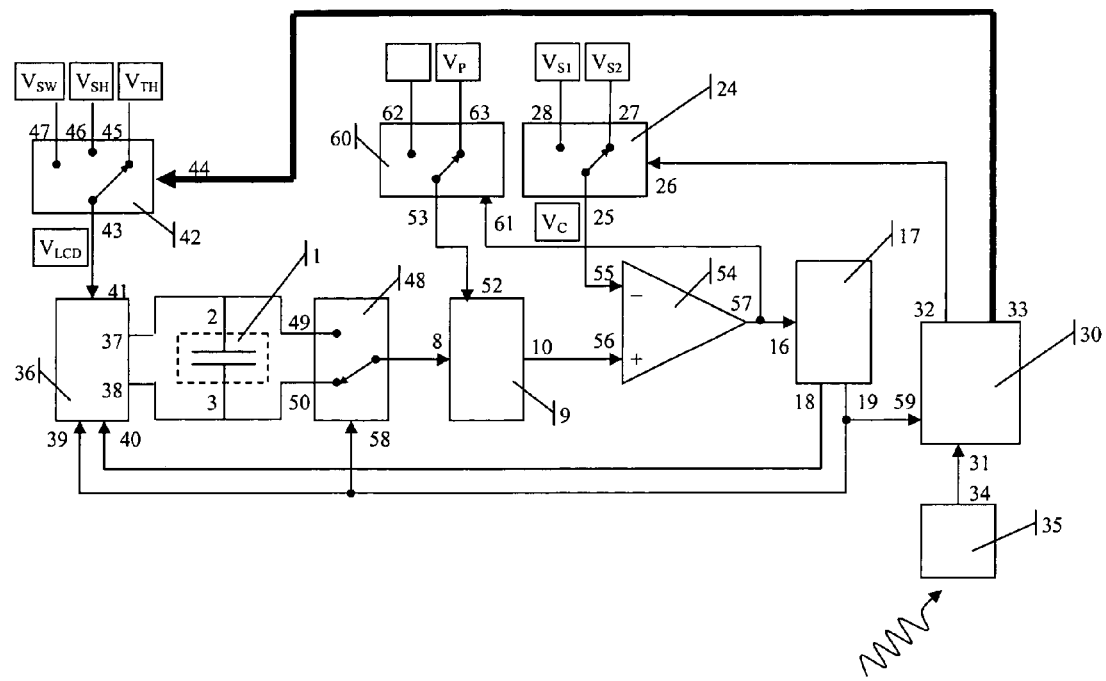
FIG. 5.—Block diagram of the electronic circuitry, allowing for the compensation of the long-term DC component of the electric driving signals, based on the "partial" time integral of the difference of the driving electric potentials across the LCD electrooptic switching element FIG. 6.—Time-dependence of the most essential electric signals of the electronic circuitry in the FIG. 5.
Figure 6:
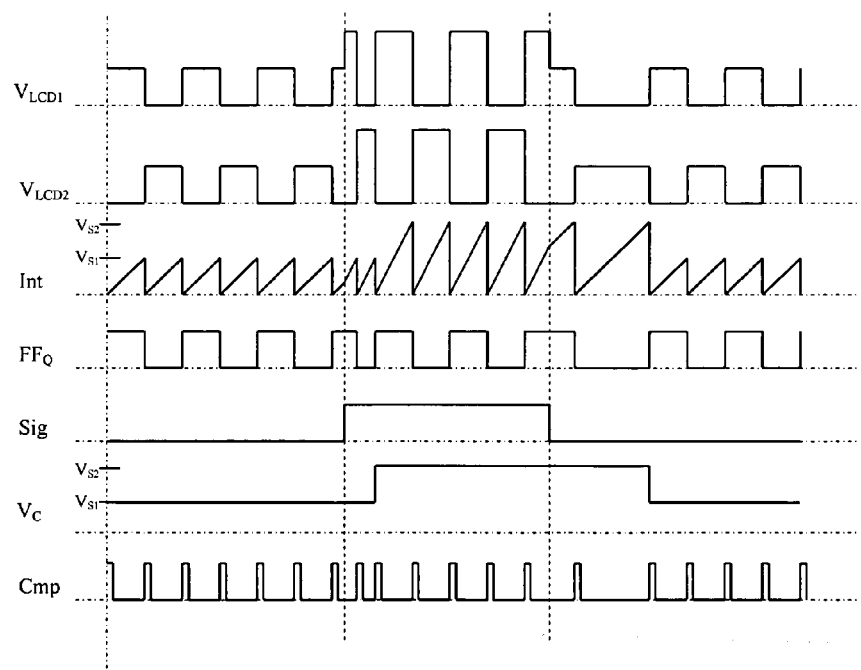

The block diagram of such an electronic driving circuitry for the driving of the LCD electrooptic switching element 1 is illustrated in FIG. 5, while the most relevant electric signals are shown in FIG. 6.

In this case the driving electric circuitry, which provides the long-term compensation of the DC voltage component of the electric driving field, is constructed in such a way that the driving signals ($V_{LCD1}$ and $V_{LCD2}$ in FIG. 6) on the electrodes 2 and 3 of the LCD electrooptic switching element 1 are connected to the inputs 49 and 50 of the analogue switch 48. Synchronously with the logic electric driving signals for the appropriately selected driving electrode of the LCD electrooptic switching element 1, which are connected to its control input 58, the analogue switch 48 selects one the two electric potentials of the driving signals and connects it via the output 51 to the input 8 of the integrator 9. The output signal 10 (Int in FIG. 6) of the integrator 9 is connected to the comparation input 56 of the comparator 54. Since the reference input 55 of the comparator 54 is connected to the electrical potential $V_C$, the signal which is generated by the comparator 54 at its output 57 (Cmp in FIG. 6), enables the control over the electric driving signals ($V_{LCD1}$ and $V_{LCD2}$ in FIG. 6.) for the LCD electrooptic switching element 1 in such a way that the integral of the DC component of the said electric driving field never exceeds the allowed value. At the same time the signal, which is generated at the output 57 of the comparator 54, which is also connected to the select input 61 of the analogue switch 60, drives the said switch in such a way that with each signal generated by the comparator, corresponding at the same time to the polarity change of the electric driving signals for the LCD electrooptic switching element 1, via its input 63, which is connected to the appropriate electric potential $V_p$, discharges the integration capacitor of the integrator 9. So the time integration of the electric driving field is restarted and so the next time interval with the reverse polarity of the electric driving signal has the same time integral as the previous one. This results in a complete compensation of the long-term DC voltage component of the electric driving field. The time dependence of the electric driving signals for the LCD electrooptic switching element 1 is determined by the comparator 54, its output 57 being connected to the input 16 of the "flip/flop" circuitry 17. Under its control the "flip/flop" circuitry 17 generates the driving signals ($FF_Q$ in FIG. 6. and $FF_{\overline{Q}}$) at its outputs 18 and 19 for each of the electrodes of the LCD electrooptic switching element 1 respectively, so that they are phase shifted for 180° (Q/$\overline{Q}$). The logic control signals at the outputs 18 and 19 of the "flip/flop" circuitry 17 are connected to the inputs 39 and 40 of the voltage translator 36 which transforms them into the electric driving signals for the LCD electrooptic switching element 1 with the adequately selected amplitude of the said driving signals at its outputs 37 and 38 connected to the control electrodes 2 and 3 of the LCD electrooptic switching element 1.

The time dependence of the amplitude of the electric driving signals for the LCD electrooptic switching element 1, providing for the maximum speed of the activation of the said switching element 1, can be optionally implemented in the above described electric driving scheme by using the analogue switch 42, controlled by the logic circuitry 30, which is in turn controlled by the sensor 35 so that it corresponds to the ideal time dependence presented in the FIG. 1. This is achieved in such way that the control electrical impulse (Sig in FIG. 6), which is generated by the sensor 35 at its output 34, connected to the input 31, activates the logic circuitry 30. The said logic circuitry via the outputs 33 of the control bus, connected to the control inputs 44 of the analogue switch 42, selects between the voltages ($V_{SW}$, $V_{SH}$, $V_{TH}$), which are connected to the inputs 45, 46, 47 of the analogue switch 42. The selected voltage $V_{LCD}$ at the output 43 is connected to the driving input 41 of the voltage translator 36. The voltage translator changes the amplitude of the logic signals which are connected to the inputs 39 and 40 and transforms them into the driving signals for the LCD electrooptic switching element 1 with the amplitude equal to the voltage on its control input 41. So the amplitude of the electric driving signals on the control electrodes 2 and 3 of the LCD electrooptic switching element 1 adopts the appropriate time dependence (FIG. 1) in accordance with the electric control impulse (Sig in FIG. 6), allowing for the maximum switching speed of the LCD electrooptic switching element 1.

The above described driving scheme for the driving of the LCD electrooptic switching element 1, due to large differences in the amplitudes of the driving signals on the electrodes 2 and 3 of the LCD electrooptic switching element 1, can cause significant differences in duration times for different driving voltage levels with the said electric driving signals. Therefore it is useful to optionally change the reference voltage level on the input 55 of the comparator 54 according to the signal generated by the sensor 35 at its output 34, which marks the activation period of the switching element, in such a way that the time-intervals of the polarity change of the electric driving signals are as uniform as possible. The appropriate selection of the reference voltage on the input 55 of the comparator 54 is provided by the logic control circuitry 30, in accordance with the signal generated by the sensor 35 on its output 34 connected to the input 31 of the said control circuitry 30 and in accordance with the digital driving signal for the LCD electrooptic switching element 1, which is connected via the output 19 of the "flip/flop" switching circuitry 17 to its synchronization input 59. So the logic circuitry 30 via its output 32 connected to the control input 26 controls the analogue switch 24. The analogue switch 24 synchronously with the signal of the sensor 35, marking the time period of the activation of the LCD electrooptic switching element 1 and the digital control signal for the said LCD electrooptic switching element 1, selects between the voltage levels $V_{S1}$ and $V_{S2}$, connected to the inputs 27 and 28 of the analogue switch in such a way that the reference voltage level $V_C$ is appropriately selected synchronously with the selected digital driving signal 19 for the LCD electrooptic switching element 1. This results in the fact that every direct current voltage compensation process is carried on to the end. The analogue switch 24 connects the selected voltage $V_C$ via its output 25 to the reference input 55 of the comparator 54 ($V_C$ in FIG. 6.). Significant increase of the symmetry of the electric driving signals for the LCD electrooptic switching element 1 is possible by using the adequate ratio between the voltage levels $V_{S1}$ and $V_{S2}$.

PREFERRED EMBODIMENT 3

The regulation of the electric driving signals based on the time integration of the electric driving voltage between the driving electrodes of the LCD electrooptic switching element 1, as described in the preferred embodiment #2, can be further simplified, if some additional assumptions can be made. Assuming that the voltage translator 36 is operating ideally (meaning that there is no significant difference between the voltage on the electrodes of the LCD electrooptic switching element 1 and the supply voltages $V_{SW}$, $V_{SH}$, $V_{TH}$ of the translator 36) and that the currently selected active driving electrode is connected to one of the driving potentials ($V_{SW}$, $V_{SH}$, $V_{TH}$) while the other one is at the same moment connected always to the same potential (for example $V_{GND}$, $V_{SS}$, $V_{DD}$), then the selection switch 48, shown in FIG. 5, is not necessary. The input 8 of the integrator 9 can be directly connected to the driving electric potential at the output 43 of the analogue switch 42 that selects between the driving electric potentials $V_{SW}$, $V_{SH}$, $V_{TH}$. The output 43 of the said analogue switch 42 is further connected to the power supply input 41 of the voltage translator 36.

Figure 9:
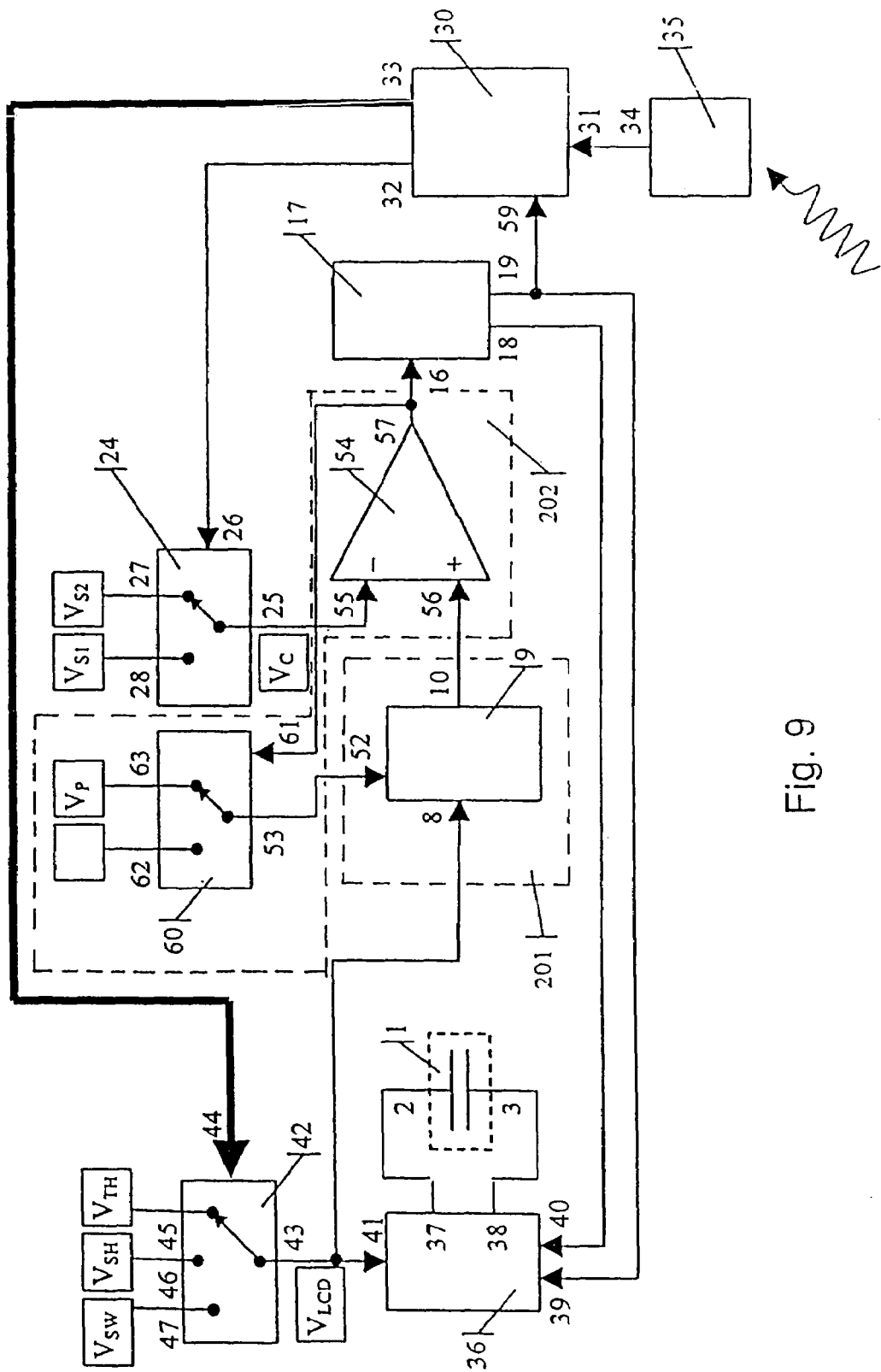

The block diagram of such simplified circuitry for the driving of the LCD electrooptic switching element 1 is illustrated in FIG. 9, while the most relevant electric signals in such circuitry are illustrated in FIG. 6.:

The simplified electric circuitry which provides the long-term compensation of the DC voltage component of the electric driving field is constructed in such a way that the output electric driving signals ($V_{LCD1}$, and $V_{LCD2}$ in FIG. 6) at the outputs 37 and 38 of the voltage translator 36 are connected only to the electrodes 2 and 3 of the LCD electrooptic switching element 1. The voltage output 43 of the analogue switch 42 is connected to the input 41 of the voltage translator 36 as well as directly to the input 8 of the integrator 9. The output signal 10 (Int in FIG. 6) of the integrator 9 is connected to the comparation input 56 of the comparator 54. Since the reference input 55 of the comparator 54 is connected to the electrical potential $V_C$, the signal, which is generated by the comparator 54 at its output 57 (Cmp in FIG. 6), enables the control over the electric driving signals ($V_{LCD1}$ and $V_{LCD2}$ in FIG. 6) for the LCD electrooptic switching element 1 in such a way that the time integral of the DC component of the said electric driving field never exceeds the allowed value. At the same time the signal, generated at the output 57 of the comparator 54, and also connected to the select input 61 of the analogue switch 60, drives the said switch in such a way that the said switch 60, with each signal generated by the comparator, corresponding at the same time to the polarity change of the electric driving signals for the LCD electrooptic switching element 1, discharges the integration capacitor of the integrator 9 by connecting it to the appropriate electric potential $V_P$, at its input 63. So the time integration of the electric driving field is restarted and the next time interval with the reverse polarity of the electric driving signal must have the same time integral as the previous one. This results in a complete compensation of the long-term DC voltage component of the electric driving field. The time dependence of the electric driving signals for the LCD electrooptic switching element 1 is determined by the comparator 54, its output 57 being connected to the input 16 of the "flip/flop" circuitry 17. Under its control the "flip/flop" circuitry 17 generates the driving signals ($FF_Q$ in FIG. 6 and $FF_{\overline{Q}}$) at its outputs 18 and 19 for each of the electrodes of the LCD electrooptic switching element 1 respectively, so that they are phase shifted for 180° ($Q/\overline{Q}$). The logic control signals at the outputs 18 and 19 of the "flip/flop" circuitry 17 are connected to the inputs 39 and 40 of the voltage translator 36, which transforms them into the electric driving signals for the LCD electrooptic switching element 1 with the adequately selected amplitude of the said driving signals at its outputs 37 and 38 connected to the control electrodes 2 and 3 of the LCD electrooptic switching element 1.

The time dependence of the amplitude of the electric driving signals for the LCD electrooptic switching element 1, providing for the maximum speed of the activation of the said switching element 1, can be optionally implemented in the above described electric driving scheme by using the analogue switch 42, controlled by the logic circuitry 30, which is in turn controlled by the sensor 35 so that it corresponds to the time dependence presented in the FIG. 1. This is achieved in such a way that the control electrical impulse (Sig in FIG. 6), generated by the sensor 35 at its output 34 connected to the input 31, activates the logic circuitry 30. The said logic circuitry 30 via the outputs 33 of the control bus, connected to the control inputs 44 of the analogue switch 42, selects between the voltages ($V_{SW}$, $V_{SH}$, $V_{TH}$), which are connected to the inputs 45, 46, 47 of the said analogue switch 42. The selected voltage $V_{LCD}$ at the output 43 is connected to the driving input 41 of the voltage translator 36. The voltage translator changes the amplitude of the logic signals, connected to the inputs 39 and 40 and transforms them into the driving signals for the LCD electrooptic switching element 1 with the amplitude equal to the voltage on its control input 41. So the amplitude of the electric driving signals on the control electrodes 2 and 3 of the LCD electrooptic switching element 1 can be varied within the required time sequence (FIG. 1.) in accordance with the electric control impulse (Sig in FIG. 6.), marking the period of the activation of the LCD electrooptic switching element 1, allowing for the maximum switching speed of the LCD electrooptic switching element 1.

The electronic control circuitry, as described in the preferred embodiment #3, can be optionally upgraded in such a way that it can compensate for the time variations in the driving of the LCD electrooptic switching element 1 resulting from the variations of the amplitude of the electric driving signals on the electrodes 2 and 3 of the LCD electrooptic switching element 1 while the comparation voltage $V_C$ is kept constant. Due to the differences in the duration of the individual driving levels it is possible, in accordance with the signal generated by the sensor 35 at its output 34, marking the activation period of the LCD electrooptic switching element 1, to change the reference voltage level at the input 55 of the comparator 54 in such a way that the time-intervals of the polarity change of the electric driving signals are as uniform as possible. The appropriate selection of the reference voltage level at the input 55 of the comparator 54 is provided by the logic control circuitry 30 in accordance with the signal of the sensor 35 the output 34 of which is connected to its control input 31 as well as with the digital control signal for the LCD electrooptic switching element 1 connected from the output 19 of the "flip/flop" switching circuitry 17 to its synchronization input 59. The logic control circuitry 30 in turn drives the analogue switch 24 via its output 32 connected to the control input 26 of the said analogue switch. The analogue switch 24 synchronously with the signal of the sensor 35, marking the time period of the activation of the LCD electrooptic switching element 1 and the digital control signal for the said LCD electrooptic switching element 1, selects between the voltage levels $V_{S1}$, and $V_{S2}$, connected to the inputs 27 and 28 of the analogue switch in such a way that the reference voltage level $V_C$ is appropriately selected synchronously with the selected digital driving signal 19 for the LCD electrooptic switching element 1. This results in a fact that every DC voltage compensation cycle is completed. The analogue switch 24 connects the selected voltage $V_C$ via its output 25 to the reference input 55 of the comparator 54 ($V_C$ in FIG. 6.). Significant increase of the symmetry of the electric driving signals for the LCD electrooptic switching element 1 is possible by using the appropriate selection of the ratio between the voltage levels $V_{S1}$, and $V_S2$.

Figure 7:
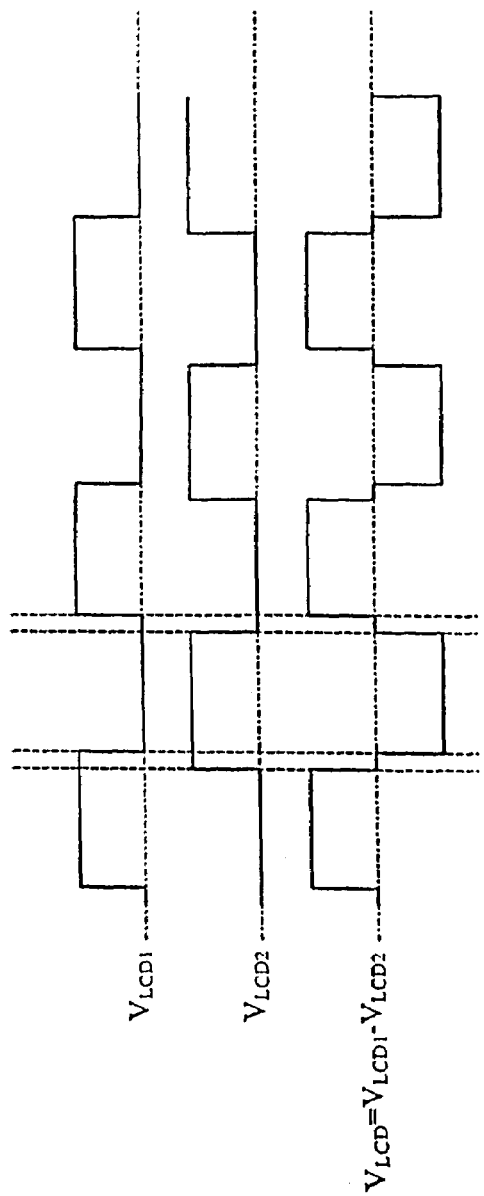
FIG. 7.—Time-dependence of the electric driving signals, allowing for the reduction of the electric energy consumption, based on the additional phase shift FIG. 8.—Block diagram of the electronic circuitry for the additional relative time/phase delay between the two electric driving signals for the LCD electrooptic switching element FIG. 9.—Block diagram of the simplified electronic circuitry, allowing for the compensation of the long-term DC component of the electric driving signals for the LCD electrooptic switching element based on the "partial" time integral of the difference of the driving voltage across the LCD electrooptic switching element FIG. 10.—Block diagram of the integrator and the comparator, which uses an additional capacitor and two toggle switches for the transfer of the charge to the integrating capacitor to reduce the input current to the integrator instead of using the large value resistor at the input to the integrator FIG. 11—The implementation of the integrator circuit following the block diagram from FIG. 10, which assures the complete transfer of the charge from the transfer capacitor into the integrating capacitor with the minimal power consumption.
Figure 8:
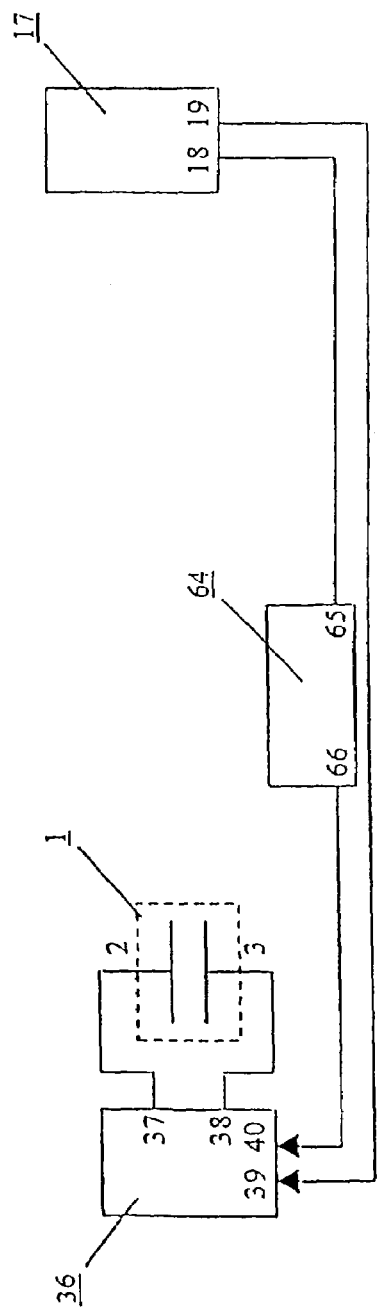

The electronic circuitry for the long-term compensation of the DC voltage component of the electric driving field based on the time integration of the difference between the electric driving signals, as described in the preferred embodiments 1, 2 and 3, can be upgraded by means of using the additional time delay of one of the driving signals as illustrated in FIG. 7. By using such a relative time delay of one of the driving signals, the electrical power consumption is significantly reduced. The basic deficiency of the standard scheme for driving the LCD electrooptic switching element by using two alternate, essentially identical electric driving signals with amplitude $V_0$, phase shifted for 180°, for each of the driving electrodes ($V_{LCD1}$, $V_{LCD2}$ in FIG. 2a) respectively, results from the fact that the electronic driving circuitry with every change of the polarity of the electric driving field for the LCD electrooptic switching element, first has to remove the entire electric charge from the capacitor, represented by the electric capacitance of the LCD electrooptic switching element and then charge it in the opposite sense. This deficiency can be corrected in such a way that with every change of the polarity of the electric driving signals both electrodes of the LCD electrooptic switching element are connected to the same electric potential for the time, which is significantly shorter than the electrooptical response of the LCD switching element (FIG. 7), but noticeably longer than the time needed to remove the electric capacitance, which is represented by the LCD electrooptic switching element. This leads to the reduction of the consumption of the electric power by approximately 50%. Such a driving scheme can be realized just by introducing the above described relative time delay between the electric driving signals $V_{LCD1}$ and $V_{LCD2}$ (FIG. 7) in such a way that the electric driving voltage between both electrodes of the LCD electrooptic switching element 1 ($V_{LCD}=V_{LCD1}-V_{LCD2}$) obtains the required time dependence. The necessary relative time delay of the electric driving signals for the LCD electrooptic switching element 1 is achieved by connecting the logic control signals for the LCD electrooptic switching element 1, generated at the output 18 of the "flip-flop" switching circuitry 17 instead of directly to the input 39 of the voltage translator 36 rather to the input 65 of the delay circuitry 64, which transforms it at its output 66 into a logic driving signal, having identical time dependence, but being adequately delayed (phase shifted)—see FIG. 8. The output of the said delay circuitry 64 is further connected to the input 39 of the volatge translator 36. The time delay is determined by the discharge time constant of the capacitor, corresponding to the electric capacitance of the LCD electrooptic switching element 1 and has to be significantly shorter than time-constant of the dynamics of its electrooptic response. Since the typical values of the discharge time-constant for the capacitor, represented by the electric capacitance of the LCD electrooptic switching element range from a few microseconds to several ten microseconds, while the time-constants of the electrooptic response are typically longer than a few milliseconds, this condition car be easily fulfilled.

The implementation of the integrator circuit—as shown with the block 201 in the FIG. 9—for the driving signals of the LCD electrooptic switching elements, as well as the implementation of the comparator and the discharging circuit for the capacitor within the integrator—as presented with the block 202 in FIG. 9—in principle conform to the requirements for the minimal power consumption, which is in directly correlated with relatively slow time variations of the polarity of the controlling signals.

Figure 10:
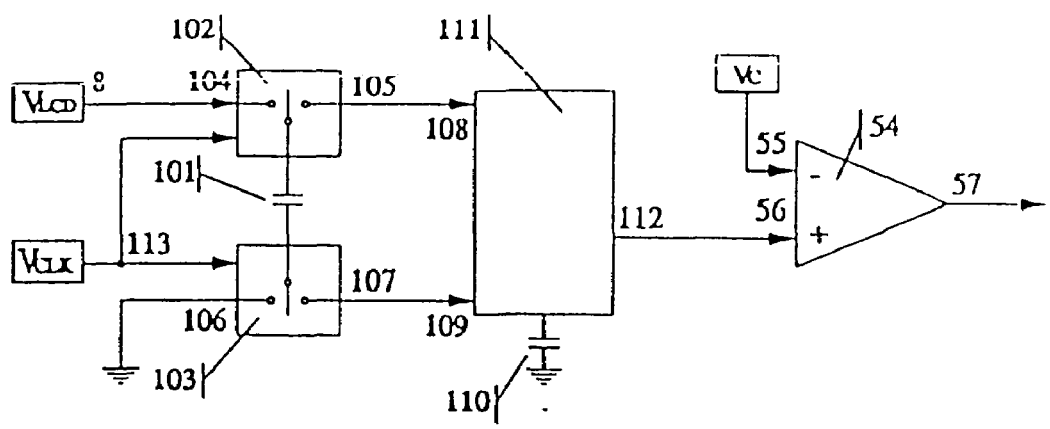

Integration—block 201 in FIG. 9: With relatively high control voltages, necessary for the LCD electrooptic switching element, the standard approach to the integration using operational amplifiers as an integrator with a large time constant is not applicable, since it consumes too much power. Large time constant can be effectively achieved by integrating the control voltage for the LCD electrooptic-switching element only periodically for a short time but still frequently enough. This means that the repetition period for integrating should be short enough not to introduce significant errors due to the unsynchronized change of the amplitude of the control signals for LCD electrooptic switching element. In the application the error should be less than 10%. Instead of charging the integrating capacitor 110 in the FIG. 10, with a DC current proportional to the driving signal for LCD electrooptic switching element, a charge proportional to the control voltage VLCD for the LCD electrooptic switching element is periodically transferred to it. The charge is transferred to the integrating capacitor 110 by the transfer capacitor 101; its capacitance is much smaller than the capacitance of the integrating capacitor 110. Such a transfer of the charge can be achieved by the use of the electronic analogue switches 102 and 103, which toggle the transfer capacitor 101 periodically between the signals for the LCD electrooptic switching element (the transfer capacitor 101 is connected between the switch inputs 104 and 106) and inputs 108 and 109 to the integrator circuit 111 (the transfer capacitor 101 is connected between the switch outputs 105 and 107). The circuitry 111 must assure the complete transfer of the charge from the transfer capacitor 102 to the integrating capacitor 110, when the switches 102 and 103 are in the corresponding positions. The electronic analogue switches need a clock signal $V_{CLK}$ 113 for toggling, typically a square wave with a suitable frequency and a duty cycle of roughly 50%; the current value of the said clock signal determines the positions of both switches at the same time. The frequency of the control signal $V_{CLK}$ is of the order of 100 Hz.

Figure 11:
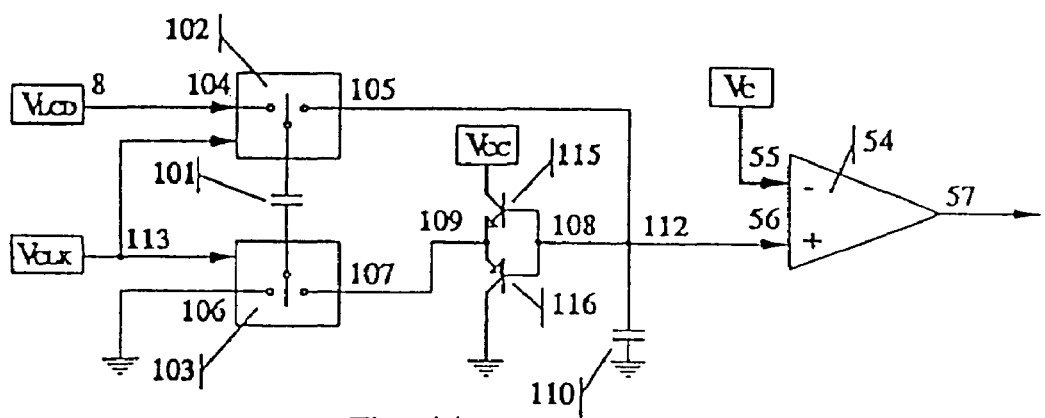

The circuit 111 assuring the complete transfer of the charge from the transfer capacitor 101 to the integrating capacitor 110, can be an amplifier with a gain of one. Also here the amplifier can not be built by an operational amplifier, since an operational amplifier consumes too much power. More suitable circuit 111 can be implemented by the use of two transistors 115 and 116 of the opposite polarity: NPN and PNP, which have their base leads interconnected and represent the input 108 to the circuit 111. Both emitter leads of these transistors are interconnected as well and represent the input 109 to the circuit 111. The remaining collector leads of both transistors are connected to the ground and the power supply respectively—see FIG. 11. The integrating capacitor 110 is connected between the input 108 of the circuit 111 and the ground. The output 112 of the circuit 111 represents the voltage across the integrating capacitor 110. The charge on the transfer capacitor 101 causes one of the transistors 115 and 116 to conduct, depending on the polarity of the charge at the transfer capacitor 101, which in turn results in the charge transfer from the transfer capacitor 101 into the integrating capacitor 110. The advantage of such circuitry is that the same charge, as brought by the transfer capacitor 101, is consumed from the power supply by one of the two transistors only during the charge transfer, the rest of the time both transistors are not conducting and thus no power is consumed from the power supply. For operation the circuit needs a power supply $V_{CC}$.

Figure 12:
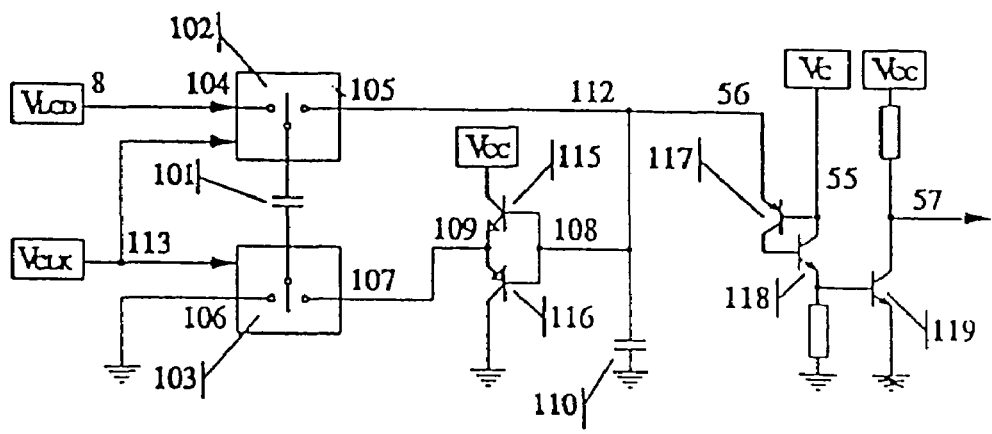
FIG. 12.—The implementation of the comparator circuit, which also discharges the integrating capacitor and has minimal electric power consumption; it is interconnected with the integrator circuit from FIG. 11 as shown in FIG. 10.

The comparation and discharging of the capacitor in the integrator as presented by means of the block 202 in the FIG. 9:

The discharge of the integrating capacitor 110, when the voltage across its terminals reaches the predefined value $V_C$, which in turn causes the polarity reversal of the LCD control signals, would normally be implemented by a standard comparator with an operational amplifier and a discharge unit; the same function can be implemented by the use of two transistors 117 and 118 of the opposite polarity NPN and PNP, where the base lead of the transistor with one polarity is connected to the collector lead of the transistor with the opposite polarity, FIG. 12. The emitter lead of the PNP transistor 117 represents an input to the comparator 54, while the interconnected base lead of the PNP transistor 117 and the collector lead of the transistor 118 represent the other input 55 to the comparator for the reference value $V_C$. When the voltage across the integrating capacitor 110 reaches the predefined value, the PNP transistor 117 starts to conduct. This causes the PNP transistor 117 to conduct the electric current, which in turn causes the conduction of the NPN transistor 118. The said transistor 118 reduces the value of the reference voltage so that the PNP transistor 117 keeps conducting until the integrating capacitor 110 is fully discharged. The output from the comparator 57 is implemented by an additional transistor 119, so that the charge impulse during the discharge of the integrating capacitor 110 through the emitter of the NPN transistor 118 causes the transistor 119 to conduct. This in turn causes the electric impulse to appear at the output 57 of the comparator 54. The discharging of the integrating capacitor 110, implemented in the way described, assures minimal power consumption, since the current is drawn from the power supply through transistors 117, 118 and 119 only during the discharge of the integrating capacitor 110. The comparator circuit needs a power supply $V_{CC}$ for operation as well.

It has to be emphasized that the above-illustrated preferred embodiments represent just three most suitable technical realizations of the proposed patent. Various modifications and changes may be however made to the described embodiments without departing from the spirit and scope of the invention as defined by the appended claims.

The invention claimed is:

1. A method of driving an LCD electrooptic switching element or LC electrooptic switching element with two electrodes where square-wave electric driving signals apply driving voltage to the two electrodes to drive the electrooptic switching element and where amplitudes of the square-wave electric driving signals can vary between different electric levels, said method comprising the steps of:
   integrating a potential difference between the two electrodes of the electrooptic switching element via an integrator to obtain a time integral value $I_{nt}$ of the electric driving voltage; and
   controlling the change of polarity of the electric driving voltage such that the time integral value $I_{nt}$ of the electric driving voltage remains within a predetermined interval $V_{C1} \leq I_{nt} \leq V_{C2}$ where $V_{C1}$ and $V_{C2}$ are electric potentials input to a reference input of a respective comparator.

2. The method according to claim 1, in cases where the amplitudes of the square-wave electric driving signals vary with time, said method further comprising the step of changing the predetermined interval for the time integral value $I_{nt}$ synchronously with a change of the polarity of said electric driving voltage across the two electrodes of the electrooptic switching element so that the synchronous change of the predetermined interval corresponds to a completion of a DC voltage component of the electric driving voltage compensation cycle, and is adjusted according to the amplitude variation of the square-wave electric driving signal in such a way that the time intervals of the polarity changes of the square-wave electric driving signals remain substantially constant.

3. An electronic circuitry for the implementation of the method of claim 1 comprising:
   an LCD electrooptic switching element or LC electrooptic switching element with two electrodes applied with square-wave driving signals, the amplitudes of which can change during an operation;
   a differential amplifier having two difference inputs where the two electrodes of the electrooptic switching element are associated with a respective, difference input of the differential amplifier;
   an integrator having an input terminal and an output terminal where a signal representing the potential difference of the two electrodes is output by the output terminal of the differential amplifier and inputted into the input terminal of the integrator, and a signal output at the output terminal of the integrator represents a time integral value of the electric driving voltage across the two electrodes of the electrooptic switching element;
   a first and a second comparator where the output terminal of the integrator is associated with a first comparator input of the first comparator and a second comparator input of the second comparator, the first comparator having a first reference input and the second comparator having a second reference input, said first reference and second reference inputs receiving a signal from electric potentials $V_{C2}$ and $V_{C1}$, respectively;

a control "flip/flop" circuit having inputs, which receive signals generated at respective, output terminals of the first and second comparators to enable a control over logic control signals for the electrooptic switching element via "set/reset" inputs of the control "flip/flop" circuit such that the control signals for each of the electrodes of the electrooptic switching element generated at outputs of the control "flip/flop" circuit are phase shifted by 180°; and a voltage translator, wherein the control signals output by the control "flip/flop" circuit are input to the voltage translator, said voltage translator transforming said control signals into electric driving signals for the electrooptic switching element and outputting the transformed control signals to the electrodes of the electrooptic switching element, the amplitude of said square-wave electric driving signals being determined by a voltage level $V_{LCD}$, which is input to a control input of the voltage translator.

4. The electronic circuitry according to claim 3, further comprising an additional analog switch, a sensor element for sensing a light intensity and logic control circuitry, wherein the additional analog switch selects between voltage levels $V_{S1}$, and $V_{S2}$ inputted to the analog switch to define a reference voltage $V_{C1}$ at its output, which is input to the second reference input of the second comparator;

wherein the sensor element generates a signal at an output of the sensor element associated with a synchronization input of the logic control circuitry in order to synchronize the logic control circuitry in such a way that a logic signal at an output of the logic control circuitry is associated with a control input of the additional analog switch, said logic signal input to the additional analog switch controls said additional analog switch synchronously with the driving signals for the electrooptic switching element and according to the signal of the sensor element in such a way that the additional analog switch selects the voltage $V_{C1}$ at its output, so that the time intervals of the polarity change of the electric driving voltage, controlled by the comparator, remain substantially constant.

5. An electronic circuitry for the implementation of an electrooptic switching element driving method, comprising:

an LCD electrooptic switching element or LC electrooptic switching element with two electrodes applied with square-wave driving electric signals, the amplitude ($V_{LCD}$) of which can change during an operation;

a first analog switch where the two electrodes of the electrooptic switching element are input to the first analog switch;

an integrator having an input that receives a signal from an output terminal of the first analog switch that represents the potential of one of the two electrodes;

a comparator having a comparator input and a reference input where a signal output by the integrator is fed into the comparator input and the reference input receives a signal from an electric potential $V_C$ to generate a signal at an output terminal of the comparator;

a control "flip/flop" circuit where the signal generated at the output terminal of the comparator enables a control of logic control signals for the electrooptic switching element via an input of the control "flip/flop" circuit such that the control signals for each of the electrodes of the electrooptic switching element generated at a first and a second output of the control "flip/flop" circuit are phase shifted by 180° and one of the control signals generated at the first and second outputs of the control "flip/flop" circuit is associated with a control input of the first analog switch, in order to select one of the inputs of the first analog switch, the output of which is connected to the input of the integrator;

a second analog switch, the select input of which is associated with the output terminal of the comparator such that with every change of the polarity of electric driving voltage across the two electrodes of the electrooptic switching element, said second analog switch switches for a short time an output associated with an input of the integrator from an electrically floating first input to a constant electric potential, at a second input, in order to reset the integrator to an initial state; and a voltage translator where control signals output by the control "flip/flop" circuit are input to the voltage translator, which transforms said control signals into the square-wave electric driving signals for the electrooptic switching element and outputs the transformed control signals to the electrodes of the electrooptic switching element, the amplitude of said square-wave driving signals being determined by the electric voltage $V_{LCD}$, which is input to a control input of the voltage translator.

6. The electronic circuitry according to claim 5, further comprising an additional analog switch, a sensor element for sensing a light intensity and a logic control circuitry, wherein the additional analog switch selects between voltage levels $V_{S1}$, and $V_{S2}$ to define a reference voltage $V_{C1}$, the voltage levels $V_{S1}$, and $V_{S2}$ being inputted to the additional analog switch, and the additional analog switch outputs a signal to the second reference input of the comparator, wherein the sensor element generates a signal at an output of the sensor element that is input to a synchronization input of the logic control circuitry in order to synchronize the logic control circuitry in such a way that a logic signal at an output of the logic control circuitry controls said additional analog switch synchronously with the driving signals for the electrooptic switching element, said output of the logic control circuitry being input to a control input of the additional analog switch, and according to the signal of the sensor element, the additional analog switch selects the voltage $V_C$ at its output, so that the time intervals of the polarity change of the electric driving voltage, as controlled by the comparator, remain substantially constant.

7. The electronic circuitry according to claim 5, characterized in that the integrator comprises an integrating capacitor, a transfer capacitor, two electronic analog switches and two transistors of the opposite polarity, wherein a complete transfer of charge from the transfer capacitor into the integrating capacitor is provided by the two transistors with base leads interconnected and emitter leads interconnected, such that an integration of the electric driving signals is achieved by a periodic, sufficiently frequent, transfer of the charge proportional to the amplitude of the electric driving signal for the electrooptic switching element into the integrating capacitor by the transfer capacitor.

8. The electronic circuitry according to claim 5, characterized in that the comparator comprises two transistors of opposite polarity having base leads connected to collector leads of the other transistor, while remaining emitter leads are connected to an integrating capacitor of the integrator and an output signal of the comparator is provided by an additional NPN transistor.

9. An electronic circuitry for the implementation of an electrooptic switching element driving method, comprising:
- an LCD electrooptic switching element or LC electrooptic switching element with two electrodes;
- a first analog switch;
- a voltage translator;
- an integrator where a voltage output of the first analog switch is associated with an input of the voltage translator and sends a signal directly to an input of the integrator;
- a comparator having a comparator input and a reference input where an output terminal of the integrator outputs a signal to the comparator input of the comparator, said reference input receiving a signal from an electric potential $V_C$ and together with the signal input to the comparator input generates a signal at an output of the comparator;
- a control "flip/flop" circuit having an input terminal for receiving the signal generated at the output of the comparator to enable control of logic control signals for the electrooptic switching element such that the control signals for each of the electrodes of the electrooptic switching element generated at outputs of the control "flip/flop" circuit are phase shifted by 180°; and
- a second analog switch having a select input associated with the output of the comparator such that with every change of the polarity of electric driving voltage for the electrooptic switching element, said second analog switch switches for a short time to output from an electrically floating first input to a constant electric potential $V_P$, at a second input, in order to reset the integrator to an initial state, said analog switching output being input to the integrator and wherein the outputs of the control "flip/flop" circuit are input to the voltage translator, which transforms said control signals into the electric driving signals for the electrooptic switching element and outputs the transformed control signals to the electrodes of the electrooptic switching element, the amplitude of said driving signals being determined by the electric voltage $V_{LCD}$, which is connected to a control input of the voltage translator.

10. The electronic circuitry as claimed in claim 9, further comprising an additional analog switch, a sensor element for sensing a light intensity and a logic control circuitry, wherein the additional analog switch selects between voltage levels $V_{S1}$, and $V_{S2}$ to define a reference voltage $V_{C1}$, the voltage levels $V_{S1}$ and $V_{S2}$ being inputted to the additional analog switch, and the additional analog switch outputs a signal to the second reference input of the comparator, wherein the sensor element generates a signal at an output of the sensor element that is input to a synchronization input of the logic control circuitry in order to synchronize the logic control circuitry in such a way that a logic signal at an output of the logic control circuitry controls said additional analog switch synchronously with the driving signals for the electrooptic switching element, said output of the logic control circuitry being input to a control input of the additional analog switch, and according to the signal of the sensor element, the additional analog switch selects the voltage $V_C$ at its output, so that the time intervals of the polarity change of the electric driving voltage, as controlled by the comparator, remain substantially constant.

11. The electronic circuitry according to claim 9, characterized in that the integrator comprises an integrating capacitor, a transfer capacitor, two electronic analog switches and two transistors of the opposite polarity, wherein a complete transfer of charge from the transfer capacitor into the integrating capacitor is provided by the two transistors with base leads interconnected and emitter leads interconnected, such that an integration of the electrooptic switching element driving signals is achieved by a periodic, sufficiently frequent, transfer of the charge proportional to the electrooptic switching element driving signals into the integrating capacitor by the transfer capacitor.

12. The electronic circuitry according to claim 9, characterized in that the comparator comprises two transistors of opposite polarity having base leads connected to collector leads of the other transistor, while remaining emitter leads are connected to an integrating capacitor of the integrator and an output signal of the comparator is provided by an additional NPN transistor.

* * * * *